(12) United States Patent
Safai

(10) Patent No.: US 10,677,762 B2
(45) Date of Patent: Jun. 9, 2020

(54) APPARATUS, SYSTEM, AND METHOD FOR INSPECTING PARTS

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 15/416,962

(22) Filed: Jan. 26, 2017

(65) Prior Publication Data

US 2018/0209943 A1 Jul. 26, 2018

(51) Int. Cl.
*G01N 29/24* (2006.01)
*G01N 29/04* (2006.01)
*G01N 29/11* (2006.01)

(52) U.S. Cl.
CPC ........... *G01N 29/24* (2013.01); *G01N 29/045* (2013.01); *G01N 29/11* (2013.01); *G01N 2291/015* (2013.01); *G01N 2291/0231* (2013.01); *G01N 2291/0237* (2013.01); *G01N 2291/0289* (2013.01); *G01N 2291/106* (2013.01); *G01N 2291/265* (2013.01); *G01N 2291/2694* (2013.01)

(58) Field of Classification Search
CPC ...... G01N 29/24; G01N 29/11; G01N 29/045; G01N 2291/2694; G01N 2291/265; G01N 2291/0231; G01N 2291/106; G01N 2291/0237; G01N 2291/015; G01N 2291/0289

See application file for complete search history.

(56) References Cited

U.S. PATENT DOCUMENTS

| | | | |
|---|---|---|---|
| 9,494,561 B1 | 11/2016 | Safai | |
| 2006/0283262 A1* | 12/2006 | Smits | G01N 27/041 73/799 |
| 2008/0314149 A1* | 12/2008 | Rueger | G01H 11/00 73/579 |
| 2011/0240621 A1* | 10/2011 | Kessler | G01N 25/72 219/200 |
| 2012/0116228 A1* | 5/2012 | Okubo | A61B 8/00 600/459 |

OTHER PUBLICATIONS

Loh, K J, Hou, T C, Lynch J P, Kotov N A "Nanotube-based sensing skins for crack detection and impact monitoring of structures"—Proceedings of the 6th International Workshop on Structural Health Monitoring, Stanford CA, Sep. 11-13, 2007 (Year: 2007).*

* cited by examiner

*Primary Examiner* — Peter J Macchiarolo
*Assistant Examiner* — John M Royston
(74) *Attorney, Agent, or Firm* — Kunzler Bean & Adamson

(57) ABSTRACT

Disclosed herein is an apparatus for inspecting structural integrity of a part. The apparatus includes a body and at least one sensor. The body is movable relative to the part. The at least one sensor is coupled to the body and includes a plurality of nanotubes configured to generate electrical signals when acted upon by an acoustic shockwave propagating through the part. The electrical signals are proportional to an intensity of the acoustic shockwave.

19 Claims, 10 Drawing Sheets

APPARATUS, SYSTEM, AND METHOD FOR INSPECTING PARTS

FIELD

This disclosure relates to testing structural integrity of a part and more particularly relates to a system that uses a plurality of nanotubes to detect abnormalities in a part.

BACKGROUND

There are many systems and methods for testing the strength of a material. Generally, the strength of a material is determined by its ability to withstand an applied load. Accordingly, many testing procedures involve applying an increasing load on a material and observing when the material elastically deforms (i.e., the range in which the material does not suffer any permanent damage or distortion), when the material plastically deforms (i.e., the range in which the material still is capable of sustaining a load but permanent damage and distortion have occurred, resulting in permanent structural defects), and when the material reaches its failure point. These testing procedures are often termed 'destructive' because the material being tested is often destroyed or at least permanently deformed to the point that it is no longer useable for its intended application.

Additionally, conventional strength tests are generally performed ex situ and usually include applying shear, compression, and/or tensile type forces to a test material. For example, when conventionally testing a metallic or a composite component of an aircraft, the component is often removed from its position in the frame (i.e., the frame is disassembled to a certain degree) or a mock component is tested instead of the actual component and the results of the test component are deemed representative of the actual component. Continuing the example of components in aircrafts, many governmental airline agencies, such as the Federal Aviation Administration (FAA) in the United States, specify periodic maintenance checks to be performed to ensure the safe operation of all the aircrafts within their jurisdictions. For example, 'C-checks' and 'D-checks' are maintenance checks that are specified to be performed by the FAA every few years on airplanes in the United States and such checks often involve component inspection. Because conventional strength testing systems and methods are performed ex situ, these checks often involve substantial cost and expense as the testers may disassemble large portions of the aircraft. In other words, conventional testing systems and procedures are not well suited for testing the strength of components in situ.

Ultrasonic testing, however, overcomes some of these shortcomings because it is a non-destructive procedure and can be implemented in situ. Ultrasonic testing involves using transducers to impart a vibration into a material and measuring the resultant feedback vibration. Depending on the characteristics of the feedback vibration, a user can identify locations in the material where the crystal lattice has abnormalities or defects. The oscillating pressure wave imparted to the material is deemed ultrasonic when the frequency of the wave is higher than the upper limit of the human hearing range. Thus, conventional ultrasonic systems generally involve waves with a frequency in the range of between about 20 kHz (20,000 Hz) and 10 MHz (10,000,000 Hz). Comparatively lower frequency sound waves can penetrate comparatively deeper into a material than higher frequency sound waves, but the higher frequency sound waves are able to detect smaller abnormalities and defects.

However, conventional ultrasonic inspection systems are unable to detect some micro-sized and nano-sized cracks, are also unable to detect some sub-surface closed cracks, and cannot detect residual stress. This is due, in part, because the sensors and transducers conventionally used in ultrasonic inspection systems are incapable of sensing the propagation of super high-frequency acoustic vibration waves (i.e., waves with a frequency higher than about 10 MHz) through a test material. Additionally, conventional ultrasonic inspection systems are unable to adequately inspect the structural integrity of thin films and coatings. While there are sensors that are capable of detecting such high frequency vibrations, conventional ultrasound inspection systems have not used such sensors to produce 2-dimensional scans of a material. In other words, the sensors that have been conventionally used to detect such high frequency vibrations are typically large, in comparison to the cracks that they are supposed to detect, and have not been used in conjunction with other sensors. Thus, some conventional ultrasound inspection systems are used as point-by-point inspection tools and, as mentioned, have not been used to create a 2-dimensional structural analysis of a material.

SUMMARY

The subject matter of the present disclosure has been developed in response to the present state of the art, and in particular, in response to the limitations of conventional ultrasonic testing and inspection systems. Specifically, conventional ultrasound testing methods and systems do not allow for objects to be inspected for the presence of micro-sized (or smaller) cracks, especially in thin materials where the cracks are closed or sub-surface. Accordingly, the subject matter of the present disclosure has been developed to provide an apparatus, system, and method for using high frequency ultrasonic waves to inspect materials that overcome at least some of the above-discussed shortcomings of prior art techniques.

Disclosed herein is an apparatus for inspecting structural integrity of a part. The apparatus comprises a body and at least one sensor. The body is movable relative to the part. The at least one sensor is coupled to the body and comprises a plurality of nanotubes configured to generate electrical signals when acted upon by an acoustic shockwave propagating through the part. The electrical signals are proportional to an intensity of the acoustic shockwave. The preceding subject matter of this paragraph characterizes example 1 of the present disclosure.

The plurality of nanotubes are carbon nanotubes. The preceding subject matter of this paragraph characterizes example 2 of the present disclosure, wherein example 2 also includes the subject matter according to example 1, above.

The at least one sensor further comprises a flexible substrate. The plurality of nanotubes are formed on and extend from the flexible substrate. The preceding subject matter of this paragraph characterizes example 3 of the present disclosure, wherein example 3 also includes the subject matter according to any one of examples 1-2, above.

The flexible substrate is made from graphene. The preceding subject matter of this paragraph characterizes example 4 of the present disclosure, wherein example 4 also includes the subject matter according to example 3, above.

The apparatus further comprises a sensor array that comprises a plurality of sensors. Each sensor of the plurality of sensors generates a composite electrical signal comprising an average of the electrical signals generated by the plurality of nanotubes of that sensor. The preceding subject matter of this paragraph characterizes example 5 of the present disclosure, wherein example 5 also includes the subject matter according to any one of examples 1-4, above.

Each sensor comprises a plurality of microphone arrays electrically isolated from each other. Each microphone array comprises a plurality of microphones electrically coupled to each other. Each microphone of the plurality of microphones comprises a portion of the nanotubes of the sensor. The preceding subject matter of this paragraph characterizes example 6 of the present disclosure, wherein example 6 also includes the subject matter according to example 5, above.

Each microphone of the plurality of microphones comprises at least 1,000 nanotubes. The preceding subject matter of this paragraph characterizes example 7 of the present disclosure, wherein example 7 also includes the subject matter according to example 6, above.

Each sensor of the sensor array comprises at least 100 microphone arrays. The preceding subject matter of this paragraph characterizes example 8 of the present disclosure, wherein example 8 also includes the subject matter according to any one of examples 6-7, above.

The sensor array comprises at least 100 sensors. The preceding subject matter of this paragraph characterizes example 9 of the present disclosure, wherein example 9 also includes the subject matter according to any one of examples 5-8, above.

The plurality of nanotubes are further configured to generate electrical signals when acted upon by phonons of sound produced by oscillation of atoms in the part, wherein the atoms in the part are oscillated by the acoustic shockwave. The preceding subject matter of this paragraph characterizes example 10 of the present disclosure, wherein example 10 also includes the subject matter according to any one of examples 1-9, above.

Also disclosed herein is a system for inspecting structural integrity of a part. The system comprises a vibration initiator configured to impart an acoustic shockwave to a part. The system also comprises an acoustic detector configured to detect the acoustic shockwave as the acoustic shockwave propagates through the part. The acoustic detector comprises plurality of nanotubes configured to generate electrical signals when acted upon by the acoustic shockwave. The system additionally comprises a reporting unit configured to determine structural integrity of the part in response to the electrical signals. The preceding subject matter of this paragraph characterizes example 11 of the present disclosure.

The acoustic detector further comprises a plurality of sensors. Each sensor comprises a plurality of nanotubes. Each sensor generates a composite electrical signal comprising an average of the electrical signals generated by the plurality of nanotubes of that sensor. The reporting unit is further configured to determine structural integrity of the part in response to the composite electrical signals generated by the plurality of sensors. The preceding subject matter of this paragraph characterizes example 12 of the present disclosure, wherein example 12 also includes the subject matter according to example 11, above.

The reporting unit generates a 2-dimensional image representative of structural integrity of the part. The 2-dimensional image comprises a plurality of 2-dimensional pixels each corresponding with a respective sensor of the plurality of sensors and each comprising a single visual representation of a condition of the part. The single visual representation of each of the plurality of 2-dimensional pixels is based on the composite electrical signal generated by the sensor corresponding with the respective 2-dimensional pixel. The preceding subject matter of this paragraph characterizes example 13 of the present disclosure, wherein example 13 also includes the subject matter according to example 12, above.

The acoustic detector detects the acoustic shockwave in synchronization with the vibration initiator imparting the acoustic shockwave to the part. The preceding subject matter of this paragraph characterizes example 14 of the present disclosure, wherein example 14 also includes the subject matter according to any one of examples 11-13, above.

The system further comprises a controller that comprises an initiation module, a detector module, and a data module. The initiation module is configured to command the vibration initiator to impart the acoustic shockwave to the part. The detector module is configured to command the acoustic detector to detect the acoustic shockwave in response to the initiation module commanding the vibration initiator to impart the acoustic shockwave and receive the electrical signals generated by the plurality of nanotubes of the acoustic detector. The data module is configured to receive electrical signal data from the detector module, the electrical signal data being representative of the electrical signals received by the detector module and communicate the electrical signal data to the reporting unit. The reporting unit determines structural integrity of the part in response to the electrical signal data. The preceding subject matter of this paragraph characterizes example 15 of the present disclosure, wherein example 15 also includes the subject matter according to any one of examples 11-14, above.

Additionally disclosed herein is a method of inspecting structural integrity of a part. The method comprises propagating an acoustic shockwave through the part and vibrating a plurality of nanotubes in response to the acoustic shockwave. An intensity of vibration of the plurality of nanotubes is proportional to an intensity of the acoustic shockwave. The method also includes generating electrical signals in response to vibration of the plurality of nanotubes. The electrical signals are proportional to the intensity of vibration of the plurality of nanotubes. The method further includes determining structural integrity of the part in response to the electrical signals.

The preceding subject matter of this paragraph characterizes example 16 of the present disclosure.

Determining structural integrity of the part comprises determining residual stress in the part. The preceding subject matter of this paragraph characterizes example 17 of the present disclosure, wherein example 17 also includes the subject matter according to example 16, above.

Determining structural integrity of the part comprises determining cracks in the part. The preceding subject matter of this paragraph characterizes example 18 of the present disclosure, wherein example 18 also includes the subject matter according to any one of examples 16-17, above.

The method further comprises averaging the electrical signals to create a composite electrical signal. Structural integrity of the part is determined in response to the composite electrical signal. The preceding subject matter of this paragraph characterizes example 19 of the present disclosure, wherein example 19 also includes the subject matter according to any one of examples 16-18, above.

The method also comprises flexing the plurality of nanotubes against the part. The plurality of nanotubes are vibrated in response to the acoustic shockwave while the plurality of nanotubes are flexed against the part. The preceding subject matter of this paragraph characterizes example 20 of the present disclosure, wherein example 20 also includes the subject matter according to any one of examples 16-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
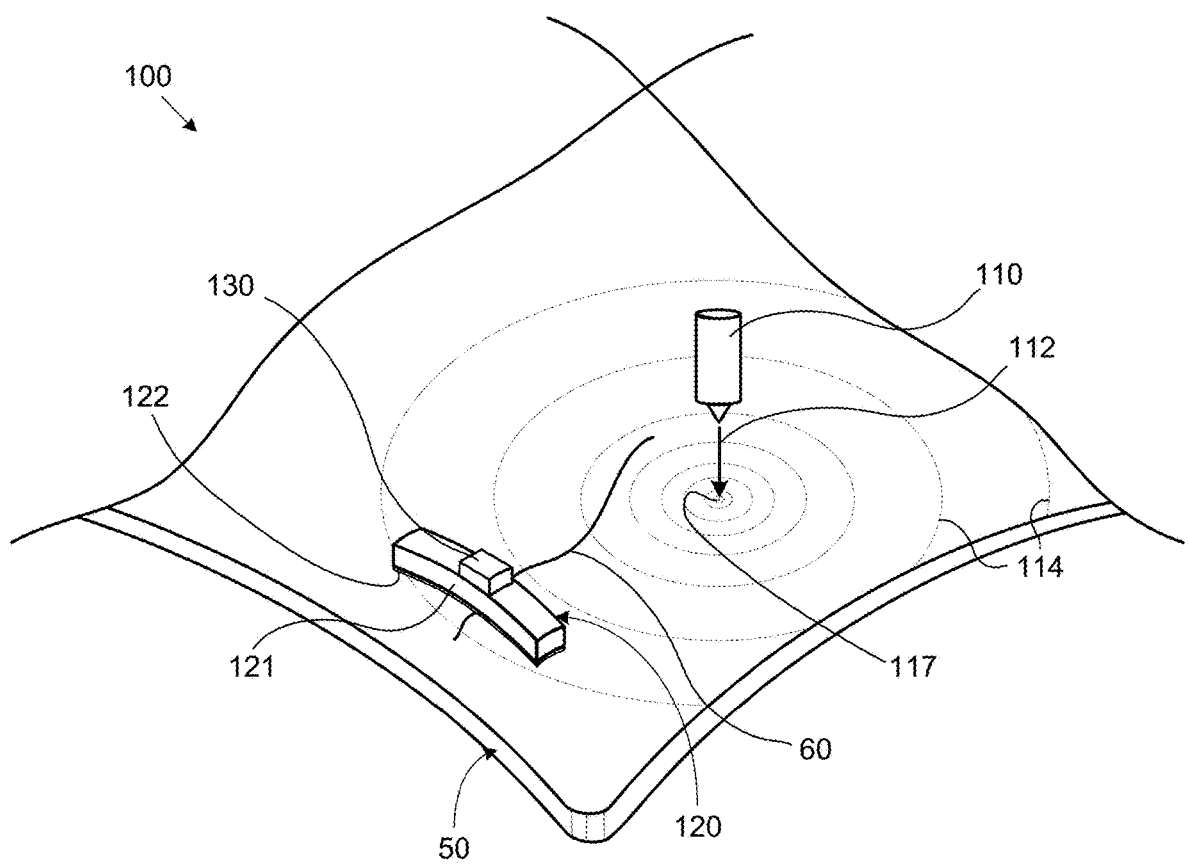
FIG. 1 is a schematic perspective view of a system for inspecting structural integrity of a part, according to one or more examples of the present disclosure.

FIG. 1 depicts one embodiment of a system 100 for inspecting structural integrity of a part 50. Generally, the system 100 inspects structural integrity of the part 50 by detecting a structural anomaly 60, such as a crack or residual stress, in the part 50. More specifically, in some implementations, the system 100 facilitates the inspection of the part 50 for the presence of micro-sized and nano-sized anomalies 60 in the crystal lattice structure of the part 50. In yet some implementations, the system 100 facilitates the inspection of the part 50 for the presence of closed, sub-surface anomalies. Throughout the present disclosure, the term "anomaly" will be used to refer to any type of structural anomaly or crystal lattice defect. For example, the term "anomaly" may be used to refer to any surface or sub-surface point, line, or planar defect present in the material of a part.

Throughout the present disclosure, the use of the term "part" will refer to any component or material to be tested that has a substantially crystalline morphology. For example, in one implementation, the part 50 is a metallic or fiber-reinforced polymer composite component in the frame of an aircraft. In another implementation, the part 50 is a semiconductor device or chip, such as an integrated circuit. The part 50 may also be made at least partially from ceramics, fiber-embedded ceramics, and metal-matrix ceramics, among other materials. As mentioned above, the part 50 may include a base layer that is coated with a thin film applied onto the base layer. In another implementation, the part 50 is relatively thick and only a portion of the part 50 near a surface of the part is inspected.

The system 100 includes a vibration initiator 110, an acoustic detector 120, and a reporting unit 130. The vibration initiator 110 is configured to pulse the surface of the part 50 with energy to create an acoustic shockwave 114 (e.g., vibration shockwave) in the part 50. The acoustic shockwave 114 depicted in FIG. 1 is shown at progressive stages of propagation. More specifically, to show the propagation of the acoustic shockwave 114, concentric circles are shown to depict the movement of the wave (i.e., a single wave) through the part 50. In other words, the vibration initiator 110, in one embodiment, initiates one acoustic shockwave 114 at a time that propagates outward from a central impact location 117.

The vibration initiator 110 can be any of various devices configured to impart an acoustic shockwave 114 into the part 50 using any of various excitation mediums 112. For example, in one implementation, the vibration initiator 110 may include a laser that stimulates high-frequency thermal vibrational movement in the part 50 via an excitation medium in the form of a pulse. The excitation medium 112, or pulse, from the laser introduces heat into the crystalline structure of the part 50, which in turn causes a high-frequency crystal lattice vibration in the part 50. In another implementation, the vibration initiator 110 includes an impact generator and the excitation medium 112 is a diamond particle of the impact generator that mechanically hits the surface of the part 50 to initiate the propagation of the acoustic shockwave 114 through the part 50 or at least along the surface of the part 50. The depth of the inspection provided by the system 100 depends on the frequency of the acoustic shockwaves (e.g., vibrations) imparted to the part 50. For example, the higher the frequency, the shallower the penetration of the acoustic shockwaves and thus the shallower the inspection coverage of the part 50. In some implementations, the vibration initiator 110 will produce an acoustic shockwave 114 with a wave frequency greater than 10 MHz.

Throughout the present disclosure, an excitation medium 112 can be any of various types of energy or material used to pulse or ping the surface of the part 50. It is contemplated that devices, sub-systems, or methods, other than those presented above, that can produce high-frequency lattice vibrations in a part fall within the scope of the present disclosure. For example, in one implementation, the excitation medium 112 includes a single pulse from an electric field, a pulse of electric current, a pulse from a magnetic field, and/or an induction current load. Additionally, the excitation medium 112 may be modulated using any of various techniques, such as those disclosed above, to develop a signal average or to improve a signal-to-noise ratio. In another embodiment, the acoustic shockwave 114 is imparted to the surface of the part 50 through the use of residual stresses artificially formed in the part 50 via mechanical loading (e.g., compression, shear, and tensile loading) and/or thermal loading using a thermal blanket (e.g., temperature cycling systems).

According to one embodiment, the vibration initiator 110 directs the excitation medium 112 onto a single location (e.g., central impact location 117) on the surface of the part 50. The excitation medium 112 may be only a short pulse of, for example, heat or electrical energy delivered to the object or a rapid ping of, for example, mechanical energy delivered to the object. Moreover, the excitation medium 112 initiates an acoustic shockwave 114 that ripples or propagates outwards, like the ripple-effect on the surface of a liquid, away from the central impact location 117 on the surface of the part 50. Control of the excitation medium 112 by the vibration initiator 110 is synchronized and correlated with the control of the acoustic detector 120 in some implementations. Further details relating to the timing synchronization or correlation between the vibration initiator 110 and the acoustic detector 120 are provided below.

Figure 4:
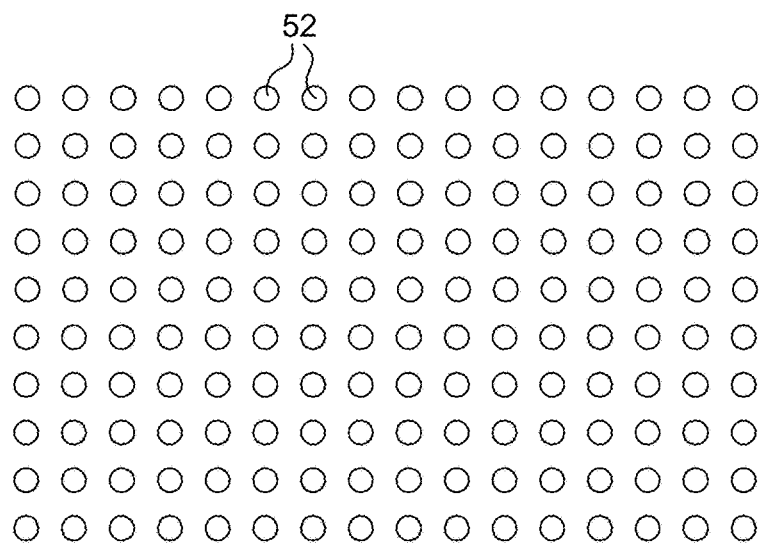
FIG. 4 is a schematic top plan view of a crystal lattice of a part that is not experiencing structural vibration of the crystal lattice, according to one embodiment.
Figure 5:
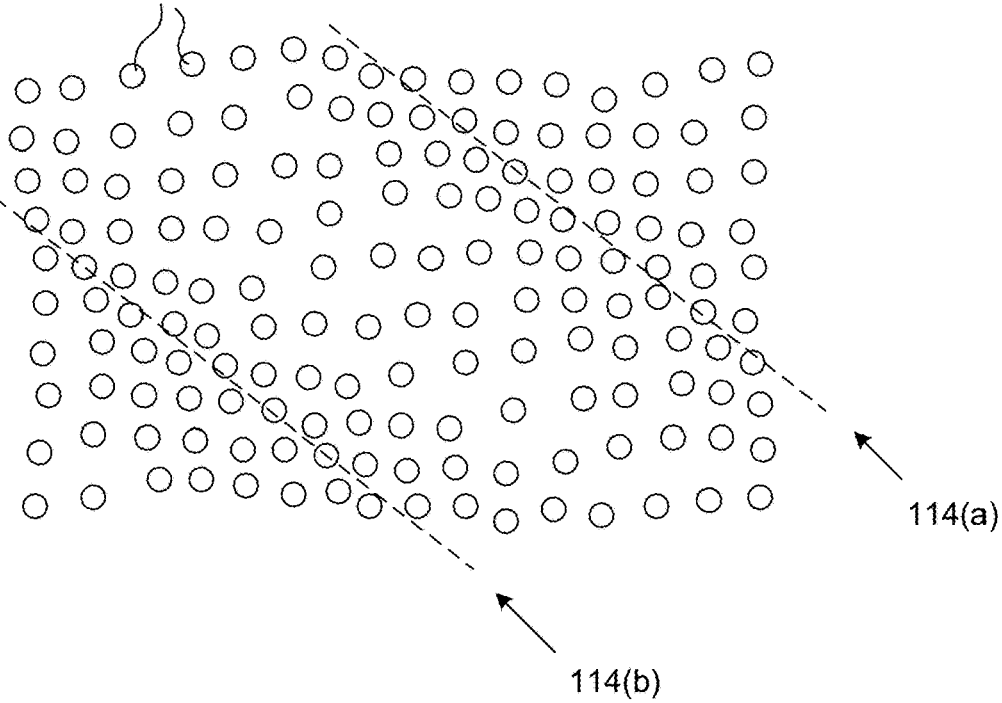
FIG. 5 is a schematic top plan view of the crystal lattice of the part of FIG. 4, but shown experiencing structural vibration of the crystal lattice due to acoustic shockwaves, according to one or more examples of the present disclosure.

FIG. 4 depicts a crystal lattice 51 of the part 50 when not experiencing crystal lattice structural vibration caused by the shockwave 114, according to one embodiment. The crystal lattice structure shown in FIG. 4 is a simplified depiction of a single plane, of multiple planes, of atoms 52. The present depiction of the crystal lattice is not intended to limit the scope of the present disclosure. Rather, FIG. 4, as well as FIG. 5, are included to show schematically how the acoustic shockwave 114 propagates through the part 50 in one embodiment. In other words, the present disclosure is not limited to parts with the crystal lattice structure depicted in FIGS. 4 and 5.

FIG. 5 depicts the crystal lattice 51 from FIG. 4 but shows the displacement of atoms 52 when the part 50 is experiencing crystal lattice structural vibration caused by the acoustic shockwave 114, according to one embodiment. Although the displacement of the atoms 52 is greatly exaggerated, FIG. 5 shows a single acoustic shockwave as it propagates through the crystal lattice 51 of the part 50 and oscillates the atoms 52 of the part. More specifically, FIG. 5 shows an acoustic shockwave, represented by the reference number 114(a), at a first point in time and the same acoustic shockwave, represented by the reference number 114(b), at a second (e.g., later) point in time as it moves through the part. The vibration or oscillation of atoms in a crystal lattice structure at a single frequency is known as a phonon. A phonon is a quantum mechanical description of a collective excitation of atoms, which equates to a quantum of sound energy. Since a quantum is the minimum amount of something in an interaction, a phonon, in terms of the present disclosure, is the smallest discrete increment of sound emanating from the lattice vibration of the acoustic shockwave 114. Thus, the acoustic shockwave 114 of the present disclosure has a frequency that is high enough and an intensity (e.g., energy) that is low enough that the vibration of the crystal lattice structure produces sound at the quantum level.

Figure 6:
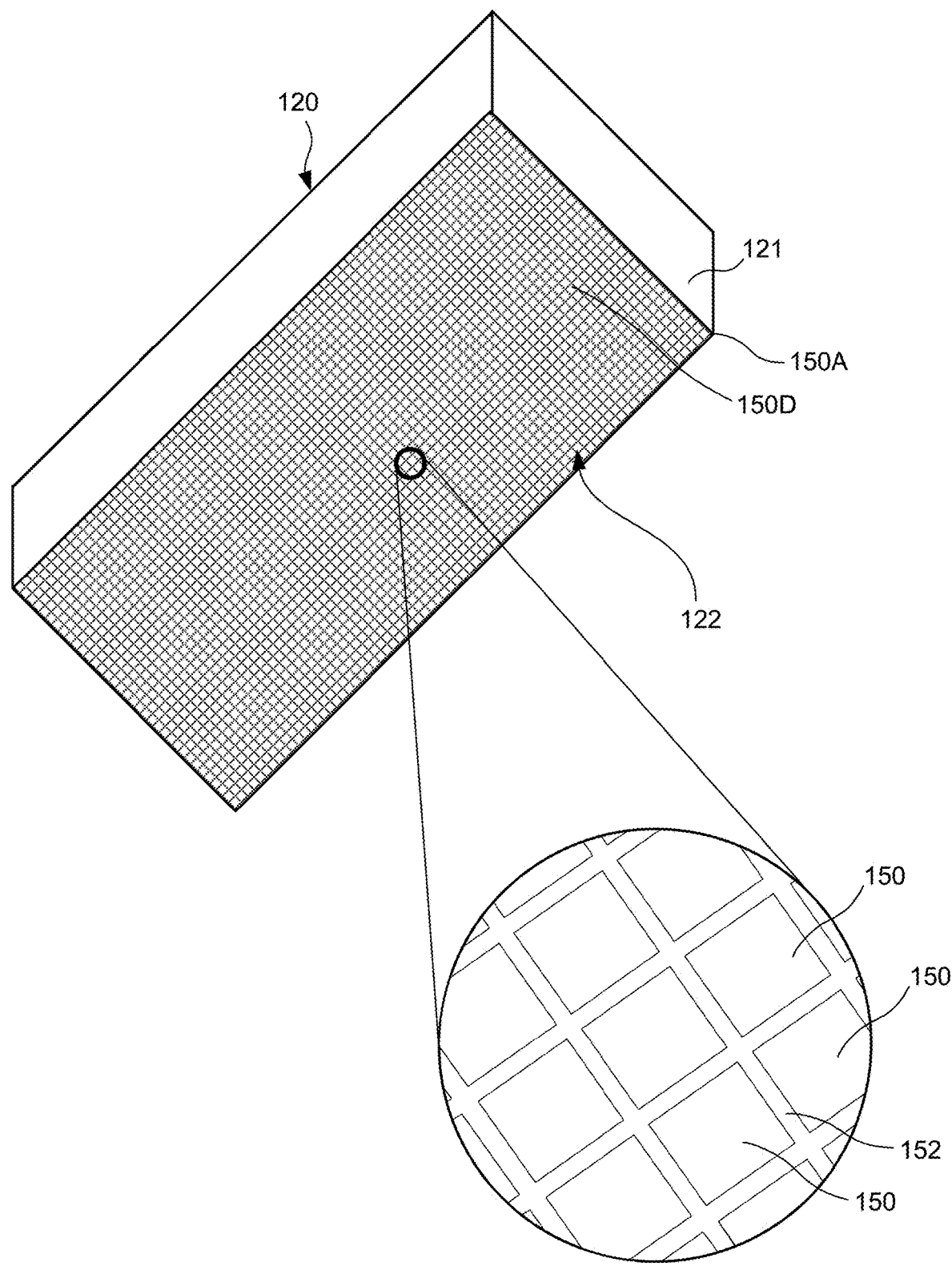
FIG. 6 is a schematic perspective view from a bottom of an acoustic detector and a detailed view of a sensor of the acoustic detector, according to one or more examples of the present disclosure.

Referring to FIG. 6, the acoustic detector 120 of the system 100 includes a body 121 or base and at least one sensor array 122 coupled to the body 121. In one implementation, the acoustic detector 120 includes only one sensor array 122. In another implementation, the acoustic detector 120 includes multiple sensor arrays 122. The body 121 can be any of various structures to which the sensor array 122 is coupleable. In one implementation, the body 121 includes a housing that encloses various internal components, such as electrical wiring and circuits, for operation of the sensor array 122. Generally, the body 121 provides a structurally strong element to which the sensor array 122 can be mounted. The body 121 is at least semi-rigid is some implementations. However, in certain implementations, the body 121 is at least partially flexible to facilitate flexing of the sensor array 122. Although not shown, the body 121 may include a robot interface for coupling the body 121 to a robot in automated testing systems or a manual interface (e.g., a handle) to facilitate manual gripping of the acoustic detector 120 in manual testing systems. In other words, it is contemplated that the system may be manually operated or automatically operated. However, due to the extremely sensitive nature of the measurements and the quantum nature of the vibrations that are being detected, it is anticipated that an automatically operated system will be more accurate and will produce better results compared to a manually operated system. Accordingly, in some implementations, the movement and placement of the various components of the system may be controlled by a robotic subsystem.

Furthermore, although the body 121 of the illustrated embodiment has a substantially rectangular shape for supporting a substantially rectangular shaped sensor array 122, in another embodiment, the body 121 has a non-rectangular shape, such as a square, triangular, circular, and hexagonal, for supporting a sensor array 122 that has a corresponding or non-corresponding non-rectangular shape. In one embodiment, the acoustic detector 120 may be sized and shaped to accommodate the particular configuration of the part 50. For example, the acoustic detector 120 may have a length to match an entire width of a part to be inspected. As another example, although a platform of the body 121 and the sensor array 122 are shown to be flat, in some implementations, the platform of the body 121 and the sensor array 122 may be curved to correspond with a part with a curved surface.

The sensor array 122 includes a plurality of sensors 150 mounted to a platform 152. Generally, the platform 152 provides a surface onto which the sensors 150 are formed or mounted. Additionally, the platform 152 also provides an electrical interface that electrically couples the plurality of sensors 150 with the body 121, and thus the reporting unit 130 as will be explained in more detail below. For example, in one implementation, the platform 152 includes at least one electrically non-conductive element (e.g., one or more layers of an electrically non-conductive substrate) and at least one electrically conductive element (e.g., electrical traces, electrical vias, and/or electrical layers) coupled to the electrically non-conductive element to facilitate the transmission of electrical signals from the sensors 150 to the body 121 and/or the reporting unit 130. In one implementation, the platform 152 is a printed circuit board, such as any of various printed circuit boards known in the art. The platform 152 can be rigid, such as a rigid printed circuit board, or the platform 152 can be flexible, such as a flexible printed circuit board.

Each sensor 150 of the sensor array 122 is configured to individually detect acoustic vibrations (e.g., phonons of sound produced by oscillations of atoms) in the part 50, for determining some characteristic of the structural integrity of the part 50, separate from the other sensors 150. More specifically, in some implementations, each sensor 150 is configured to detect acoustic vibrations in the part 50 and generate a single acoustic vibration representation (e.g., value) at a time for representing the detected acoustic vibrations. Referring to the detailed view of FIG. 6, the sensors 150 are spatially arranged on the platform 152 so as to correspond with different locations of the part 50. More specifically, the sensors 150 are positioned adjacent each other in a side-by-side manner to form the sensor array 122 on the platform 152. In one implementation, the sensors 150 are spaced an equal distance apart from each other such that a uniform gap is defined between adjacent sensors. Although shown as forming a substantially square shape, in some implementations, each sensor 150 can form any of various other shapes, such as hexagonal, triangular, circular, ovular, and rectangular. Furthermore, although each of the sensors 150 of the sensor array 122 in the illustrated embodiment has the same shape, in other embodiment, some of the sensors 150 may be shaped differently than other sensors 150.

The sensor array 122 has a high quantity of sensors 150. According to one implementation, the sensor array 122 includes a quantity of sensors 150 with an order of magnitude of at least two. In other words, in one implementation, the sensor array 122 includes at least one hundred sensors 150. However, in another implementation, the sensor array 122 includes a quantity of sensors 150 with an order of magnitude of at least three. In other words, in one implementation, the sensor array 122 includes at least one thousand sensors 150.

In operation, the acoustic detector 120 is positioned above, and in close proximity to a surface of, an area of the part 50 to be inspected. Each sensor 150 of the sensor array 122 of the acoustic detector 120 detects acoustic vibrations in the part 50 at the portion of the part 50 aligned with the sensor 150. As will be explained in more detail below, the acoustic vibrations detected by each of the sensors 150 are combined to form an acoustic vibration scan of an area of the part 50 corresponding with the area of the sensor array 122. For example, if the cross-sectional area of the sensor array 122 is five square inches, the acoustic vibrations detected by each of the sensors 150 within the sensor array 122, when combined, represents data acquired from a five square inch cross-sectional area of the part 50. In some embodiments, the acoustic detector 120 is positioned such that the sensor array 122 is in contact with (e.g., rests on) the surface of the part 50. In contrast, in other embodiments, the acoustic detector 120 is positioned in a spaced apart manner with the surface of the part 50 such that a gap exists between the part 50 and the sensor array 122.

The acoustic detector 120 may be systematically moved across the part 50 (e.g., along a length or width) as the acoustic detector 120 detects the acoustic vibrations from the acoustic shockwave 114. In such an example, the entire surface area of the part 50 may be inspected by moving the acoustic detector 120 across the area of the part 50. The size of the acoustic detector 120 (e.g., the effective cross-sectional area of the sensor array 122) may depend on the specifics of a given application. In one embodiment, for example, the cross-sectional area of the sensor array 122 of the acoustic detector 120 is between about 1 square inch and about 5 square inches. In another embodiment, the cross-sectional area of the sensor array 122 of the acoustic detector 120 may greater than about 5 square inches. The size of the acoustic detector 120 may depend on the size and number of sensors 150 of the sensor array 122.

Figures 7, 8:
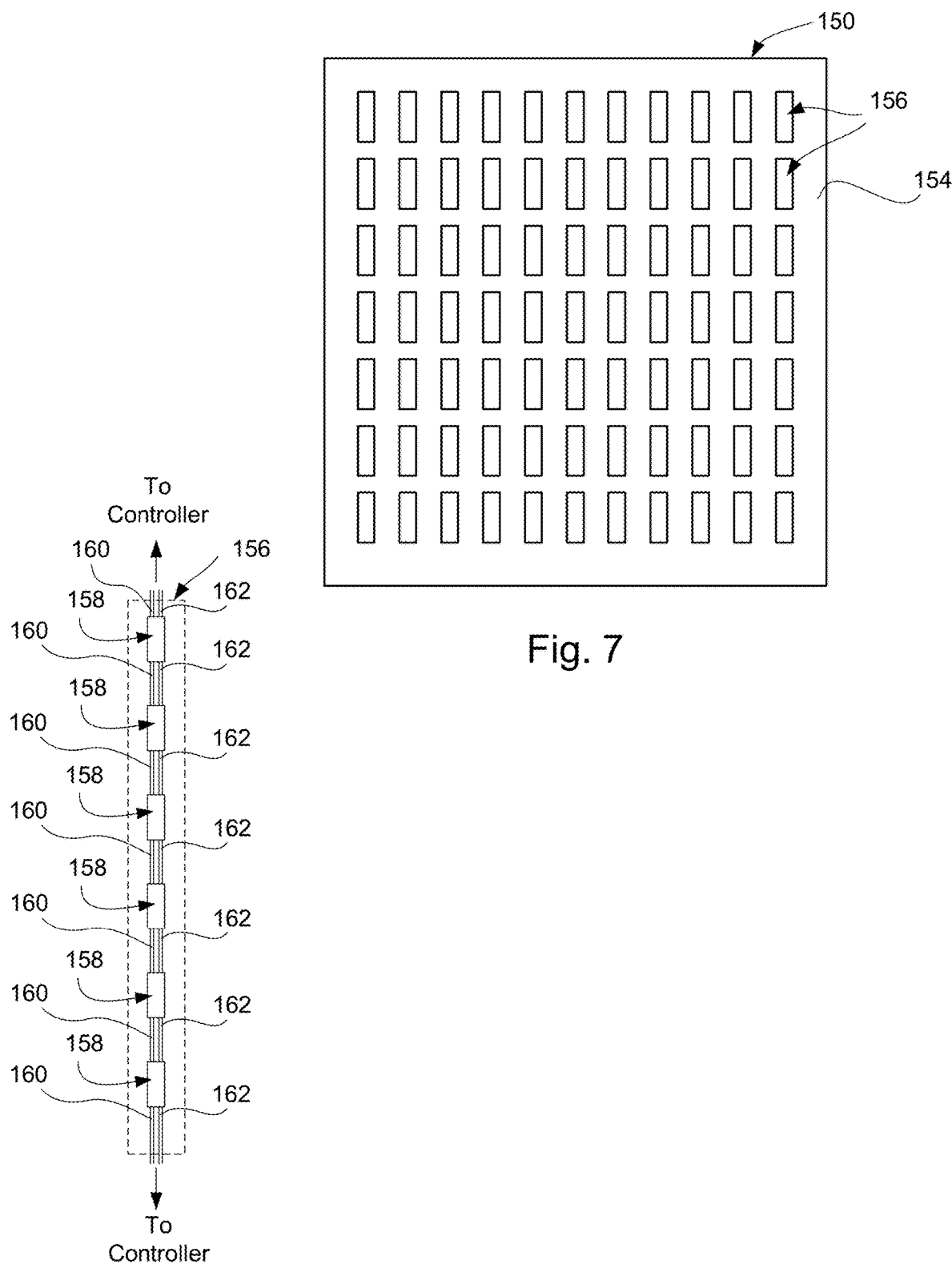
FIG. 7 is a schematic top plan view of a pixel of the sensor of the acoustic detector of FIG. 6, according to one or more examples of the present disclosure.
FIG. 8 is a schematic top plan view of a microphone array of the pixel of FIG. 7, according to one or more examples of the present disclosure.

Referring to FIG. 7, each sensor 150 of the sensor array 122 of the sensor array 122 includes a plurality of microphone arrays 156. The microphone arrays 156 are electrically isolated from each other on a substrate 154. The substrate 154 can be a printed circuit board or other substrate configured to provide electrical isolation between the plurality of microphone arrays 156. The microphone arrays 156 are arranged in any of various patterns on the substrate. In the illustrated implementation, the microphone arrays 156 are arranged in an end-to-end manner to form columns and a side-by-side manner to form rows. The microphone arrays 156 of each sensor 150 are spaced apart from each other, an equal distance in some implementations, such that a gap is defined between adjacent microphone arrays 156. Each sensor 150 includes a relatively high quantity of microphone arrays 156. For example, in one implementation, each sensor 150 includes a quantity of microphone arrays 156 with an order of magnitude of at least two. In other words, in one implementation, each sensor 150 includes at least one hundred microphone arrays 156. However, in another implementation, each sensor 150 includes a quantity of microphone arrays 156 with an order of magnitude of at least three. In other words, in one implementation, each sensor 150 includes at least one thousand microphone arrays 156.

Figure 10:
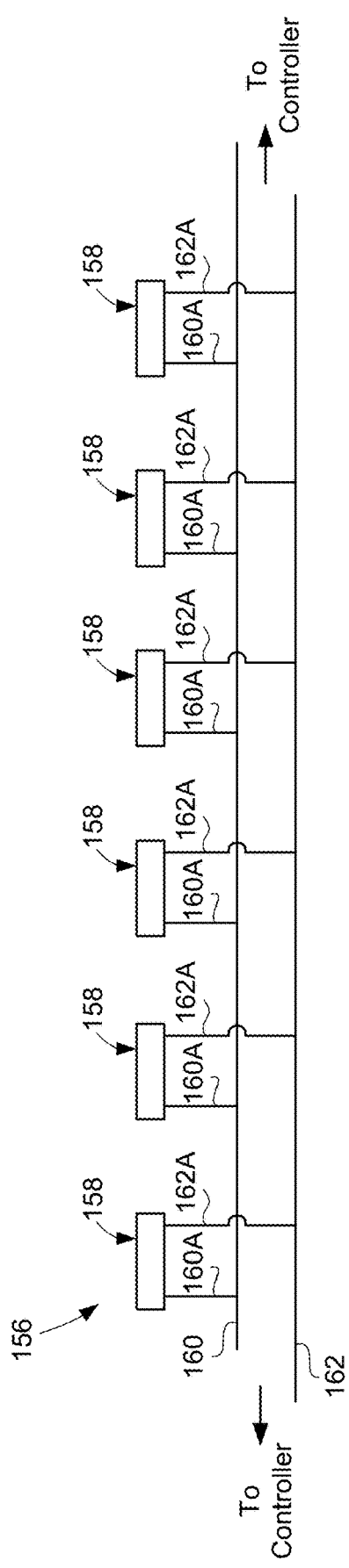
FIG. 10 is a schematic side elevation view of the microphone array of FIG. 8, according to one or more examples of the present disclosure.

Now referring to FIGS. 8 and 10, each microphone array 156 includes multiple microphones 158 that are electrically coupled to each other via a first trace 160 and a second trace 162. As shown, the microphones 158 of each microphone array 156 are arranged in an end-to-end manner to effectively form a generally elongate microphone array 156 with a substantially rectangular shape (as indicated by dashed lines). In other implementations, the microphones 158 of each microphone array 156 are arranged in another manner, such as a side-by-side and end-to-end manner, to effectively form a shape other than rectangular, such as square, circular, and triangular. As shown, each microphone array 156 includes six microphones 158. However, in other implementations, each microphone array 156 includes fewer than six microphones 158, such as, for example, a single microphone 158, or more than six microphones 158, such as an order of magnitude of at least two. The first trace 160 is a positive trace and the second trace 162 is a negative trace. As presented above, the first trace 160 and the second trace 162 of each microphone array 156 of a sensor 150 are electrically coupled to each of the microphones 158 of the microphone array 156, but are electrically isolated from the first trace 160 and the second trace 162 of other microphone arrays 156 of the sensor 150. The first trace 160 and the second trace 162 of each microphone array 156 are electrically coupled with a controller 300 (see, e.g., FIG. 13).

Figure 9:
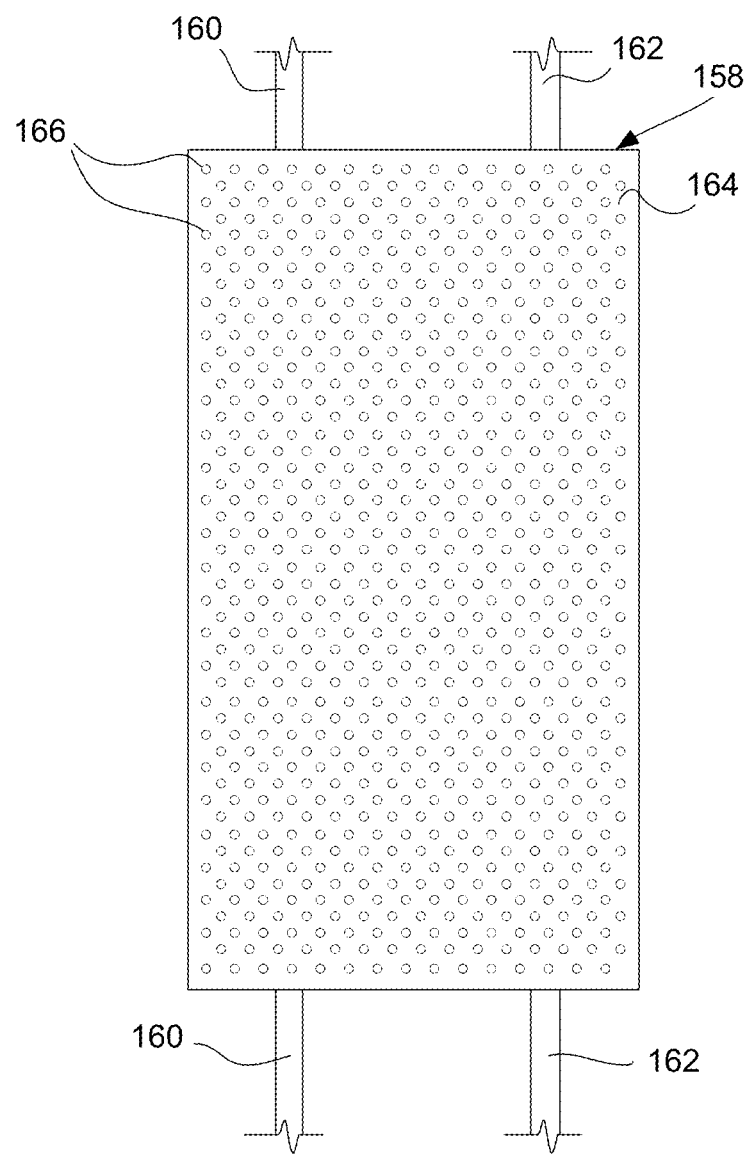
FIG. 9 is a schematic top plan view of a microphone of the microphone array of FIG. 8, according to one or more examples of the present disclosure.
Figure 11:
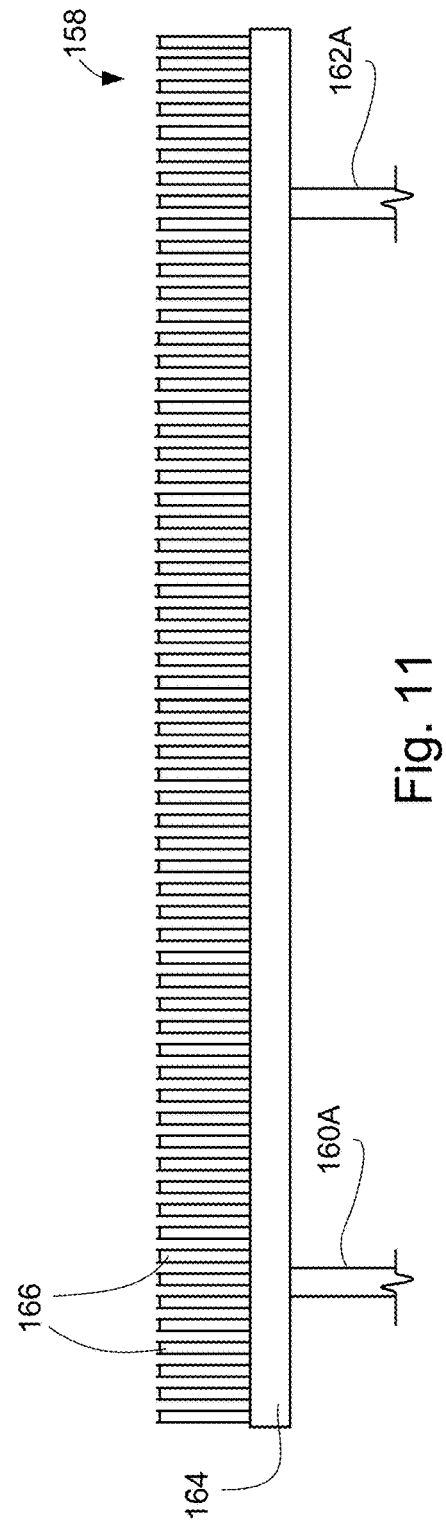
FIG. 11 is a schematic side elevation view of the microphone of FIG. 9, according to one or more examples of the present disclosure.

Referring to FIGS. 9 and 11, each microphone 158 of the microphone arrays 156 includes a substrate 164 and a plurality of nanotubes 166 formed on and extending from the substrate 164. The substrate 164 is flexible in one implementation. For example, the substrate 164 is made from graphene, which is substantially flexible, in an implementation. According to some implementations, the nanotubes 166 are flexible. Therefore, the combination of a flexible substrate 164 and flexible nanotubes 166 promotes the flexibility of the microphones 158, and thus the microphone arrays 156, the sensors 150, and the sensor array 122. The flexibility of the sensor array 122 promotes the conformity of the sensor array 122 to the surface of the part 50, which improves the accuracy and sensitivity of the sensor array 122.

Although represented as a thread-like element in FIG. 11, each nanotube 166 has a cylindrical nanostructure with a relatively high length-to-diameter ratio. The nanotubes 166 can be single-walled, double-walled, or multi-walled nanotubes. According to some embodiments, the nanotubes 166 are carbon nanotubes. Carbon nanotubes have a fullerene structure. For example each carbon nanotube may be a long, hollow structure with walls formed of one-atom-thick sheets of carbon or graphene rolled into a cylindrical or tubular shape. Generally, the nanotubes 166 are formed on the substrate 164 using any of various deposition techniques, such as vapor deposition. Such techniques, particularly vapor deposition techniques, promote the formation of a large number of uniformly configured nanotubes 166. As will be appreciated, the ability to produce uniform nanotubes 166 promotes accurate and reliable detection of acoustic vibrations.

Each microphone 158 includes a substantially high quantity of nanotubes 166. For example, in one implementation, each microphone 158 includes a quantity of nanotubes 166 with an order of magnitude of at least three. In other words, in one implementation, each microphone 158 includes at least one thousand nanotubes 166. The sheer quantity of nanotubes 166 of the acoustic detector 120, let alone of a single microphone 158, and the electrical isolation of microphone arrays 156 of the sensors 150 help to promote accurate readings by increasing the data points and substantially reducing and/or eliminating erroneous readings, such as erroneous readings due to defective components. In other words, the size and quantity of the nanotubes 166 on the acoustic detector 120 are proportional to the accuracy of the scan. Therefore, the size and quantity of the nanotubes 166 determines the accuracy of the resultant report/image. In view of the nano-scale size of the nanotubes 166 and the large quantity of nanotubes 166 (e.g., at least 100×100×6× 1000 in one implementation), the acoustic detector 120 promotes the accuracy of the resultant 2-dimensional image (e.g., see FIG. 12) or other structural integrity report, as will be described in more detail below.

The atoms forming the nanotubes 166, particularly carbon nanotubes, are chemically bonded together with so-called $sp^2$ bonds, which are extremely strong (e.g., tensile strength) compared to other types of chemical bonds. Accordingly, the nanotubes 166 exhibit superior strength and durability. Additionally, the nanotubes 166 have a relatively low coefficient of thermal expansion (CTE). Although carbon nanotubes have been described above, the nanotubes 166 can be other types of nanotubes, such as boron-carbon-nitrogen (BCN) nanotubes, gallium nitride nanotubes, silicon nanotubes, and the like. In certain applications, each individual nanotube 166 may be doped with an inert gas, such as nitrogen, argon, or boron to alter the properties of the nanotube 166. According to some manufacturing techniques, doping the nanotubes 166 with an inert gas assists with the formation of sheets of material into a tubular configuration.

The nanotubes 166 and the substrate 164 are electrically semi-conductive. In other words, each nanotube 166 is capable of conducting an electrical charge. Moreover, the nanotubes 166 exhibit piezoelectric properties. For example, as a mechanical stress is applied to a nanotube 166, an electric charge accumulates in the nanotube 166. Accordingly, when acted upon by the acoustic shockwave propagating through the part 50 (e.g., acted upon by phonons of sound (i.e., acoustic vibrations) produced by the oscillation of atoms caused by the acoustic shockwave), an electrical charge proportional to the intensity of the acoustic shockwave accumulates in each nanotube 166. Because of the nano-scale size of the nanotubes 166 (e.g., walls that are only one-atom-thick), the nanotubes 166 tend to accumulate electrical charges even when the mechanical stress applied to the nanotubes 166 is very small. Accordingly, the nanotubes 166 are capable of detecting smaller acoustic vibrations of atoms in a lattice structure than any conventional piezoelectric devices. For this reason, utilizing the piezoelectric nature and size of the nanotubes 166, acoustic vibrations of an intensity that have been previously undetectable are detectible by the nanotubes 166. Moreover, because abnormalities of the acoustic vibrations of atoms in a lattice structure indicate abnormalities in the part 50, the nanotubes 166 of the acoustic detector 120 promote the detection of certain abnormalities (e.g., micro-cracks, nano-cracks, and residual stresses) that have been previously undetectable. Also, in addition or alternative to detecting the intensity of the acoustic vibrations, the nanotubes 166 can be configured to detect the orientation or direction of vibration, frequency of vibration, etc.

For a given microphone 158, the electrical charge or signal accumulated in each nanotube 166 in the presence of acoustic vibrations is transmitted to the substrate 164 of the microphone 158. Accordingly, the accumulated electrical charges from all of the nanotubes 166 of a given microphone 158 accumulate in the substrate 164 of the microphone 158. The accumulated electrical charge or signal in the substrate 164 is transmitted to one of the first trace 160 and the second trace 162, depending on which is acting as the positive trace and which is acting as the negative trace, via one of a first sub-trace 160A and a second sub-trace 162A of the given microphone 158. Therefore, the accumulated electrical charges in all the substrates 164 of a microphone array 156 are combined and transmitted through the one of the first trace 160 and the second trace 162 to the controller 300 as a microphone array electrical charge. The microphone array electrical charges from all the microphone arrays 156 of a given sensor 150 are combined to form a composite electrical signal (e.g., pixel electrical charge). In some implementations, the composite electrical signal is an average of the microphone array electrical charges, which average is determined by a detector module 320 of the controller 300. In other implementations, the composite electrical signal is a summation of the microphone array electrical charges. Regardless, the intensity (e.g., voltage) of the composite electrical signal is dependent on the intensity of the acoustic vibrations sensed by the nanotubes 166 of the microphones 158 of the microphone arrays 156 of the given sensor 150. In other words, the intensity of the composite electrical signal changes proportionally with changes in the intensity of the acoustic vibrations sensed by the nanotubes 166. The acoustic detector 120 may transmit data to the reporting unit 130 via a hard-line connection or through wireless communication networks.

Although described in greater detail below with reference to FIG. 13, in certain configurations it may be beneficial for the vibration initiator 110 and the acoustic detector 120 to be synchronized or at least have a known distance and timing correlation between the vibration initiator 110 and the acoustic detector 120 in order to accurately detect and report acoustic vibration data. In other words, the timing of the ping/pulse of the excitation medium 112 and the timing of the 'detecting' may be correlated to improve and ensure an accurate inspection.

Because the sensor array 122 is detecting diminutive lattice vibrations, i.e. extremely or very small lattice vibrations (for example, as low as 1 eV (electron volt), it is anticipated that the testing site will be substantially quiet and will not have any disturbances that might disturb the accuracy of the sensed acoustic vibration data detected by the sensor array 122. Some components of the system 100, such as the vibration initiator 110, can be similar to those described in U.S. Pat. No. 9,494,561, filed Sep. 11, 2013, which is incorporated herein in its entirety.

Generally, the reporting unit 130 of the system 100 is configured to determine structural integrity of the part 50 in response to acoustic vibration data (e.g., in the form of electrical signals) from the nanotubes 166 of the acoustic detector 120. More specifically, the reporting unit 130 of the system 100 is configured to generate a 2-dimensional image or representation that is representative of structural integrity of the part 50 in response to composite electrical signals received from the sensors 150 of the acoustic detector 120. The 2-dimensional image generated by the reporting unit 130, or corresponding data, forms at least a part of a structural integrity report. The 2-dimensional image or corresponding data generated by the reporting unit 130 can be immediately used to display the image or data to a user. Alternatively, the 2-dimensional image or corresponding data generated by the reporting unit 130 can be stored in memory on the reporting unit 130 or other device and used at a later time by the reporting unit 130 or other device.

Figure 12:
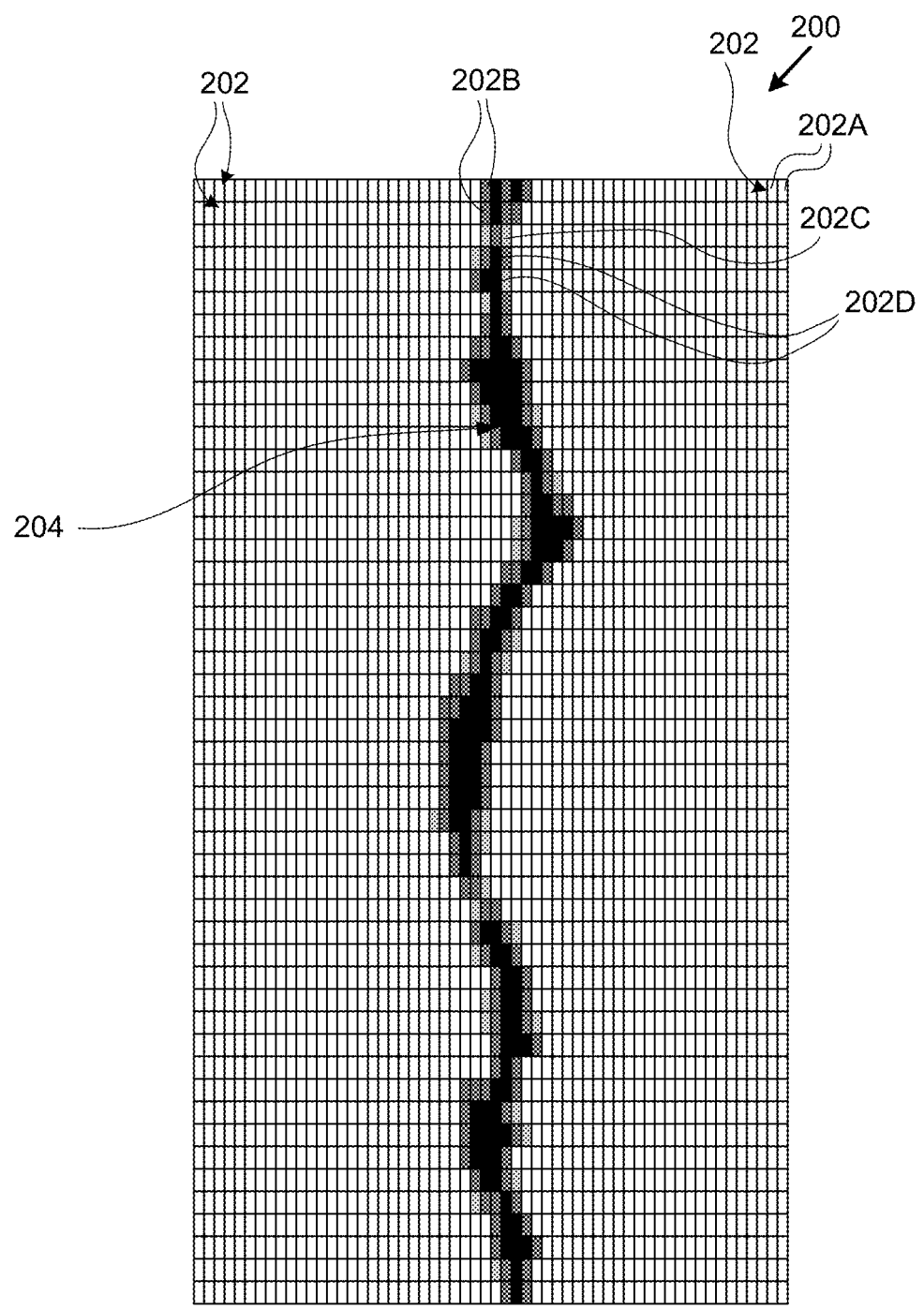
FIG. 12 is a 2-dimensional image representative of structural integrity of a part, according to one or more examples of the present disclosure.

Referring to FIG. 12, one embodiment of a 2-dimensional image 200 of a structural integrity report is shown. The 2-dimensional image 200 includes a representation of an anomaly (e.g., crack or residual stress riser) in the part 50 as detected by the acoustic detector 120. The 2-dimensional image 200 includes a plurality of 2-dimensional pixels 202 each having a rectangular shape (although other shapes can be used). Each 2-dimensional pixel 202 corresponds with a respective one of the sensors 150 of the sensor array 122 of the acoustic detector 120. The characteristic (e.g., color, shade, brightness, etc.) of each 2-dimensional pixel 202 represents a value corresponding with the intensity of the composite electrical signal from the associated sensor 150 of the sensor array 122. In other words, each 2-dimensional pixel 202 has a characteristic that corresponds with the intensity of the acoustic vibrations detected by a given sensor 150 of the sensor array 122. For example, the characteristic of a 2-dimensional pixel 202 (e.g., 2-dimensional pixel 202A) of the 2-dimensional image 200 corresponding with a sensor 150 (e.g., sensor 150A of FIG. 6) with a strong composite electrical signal is different that the characteristic of a 2-dimensional pixel 202 (e.g., 2-dimensional pixel 202D) of the 2-dimensional image 200 corresponding with a sensor 150 (e.g., sensor 150D of FIG. 6) with a weak composite electrical signal.

According to one particular example, a crystal lattice will experience acoustic vibrations with frequencies between about $10^{10}$ Hz and about $10^{12}$ Hz in the presence of the shockwave. Generally, because of the close proximity of neighboring atoms, a normal crystal lattice, or a crystal lattice without abnormalities, experiences mid-to-high levels of acoustic vibration (e.g., between about $10^{11}$ Hz and about $10^{12}$ Hz) in the presence of an acoustic shockwave. However, because of the gaps or voids between atoms caused by abnormalities such as cracks and residual stress, an abnormal crystal lattice, or a crystal lattice with abnormalities, experiences low-to-mid levels of acoustic vibration (e.g., between about $10^{10}$ Hz and about $10^{11}$ Hz in one particular implementation) at the abnormalities in the presence of an acoustic shockwave. Accordingly, a strong composite signal (e.g., between about 50 eV and about 100 eV in one particular implementation) indicates strong acoustic vibrational activity and thus a normal crystal lattice or a crystal lattice without abnormalities. In contrast, a weak composite signal (e.g., between about 1 eV and about 50 eV in one particular implementation) indicates weak acoustic vibrational activity and thus an abnormality in the crystal lattice. For example, a lighter 2-dimensional pixel (e.g., 2-dimensional pixels 202A) indicates a stronger composite signal and thus a relatively normal crystal lattice, while a darker 2-dimensional pixel (e.g., 2-dimensional pixels 202B, 202C, 202D) indicate a weaker composite signal and thus an abnormality in the crystal lattice. In other words, the darker the 2-dimensional pixel, the more significant or pronounced the abnormality. For example, the abnormality at the 2-dimensional pixels 202B is less pronounced than at the 2-dimensional pixels 202D. The 2-dimensional image 200 helps visually identify the scope and location of an abnormality 204 in the part 50 by grouping together darker 2-dimensional pixels at the abnormality. Although the structural integrity report generated by the reporting unit 130 includes a 2-dimensional image in some implementations, in other embodiments, the structural integrity report includes a chart, table, graph, listing, or other form of information.

Unlike conventional crack detection systems, because of the use of nanotubes 166 in the system 100 of the present disclosure, very small abnormalities like residual stress can be detected. As presented above, the nanotubes 166 are sensitive enough to detect even minor variations in the acoustic vibrations caused by acoustic shockwaves. Further, unlike cracks, the drop in acoustic vibrations caused by residual stresses in the part 50 is relatively small. Conventional techniques are unable to detect such small drops in acoustic vibrations. However, the sensitivity of the nanotubes 166 allows the acoustic detector 120 to detect such small drops in acoustic vibrations and thus residual stress in the part 50. By detecting residual stress in the part 50, the formation of cracks often caused by residual stress can be prevented. In some implementations, for example, the nanotubes 166 of the system 100 promote the detection of defects in the part 50 that are as small as about 1,000 nm (nanometers).

Figure 2:
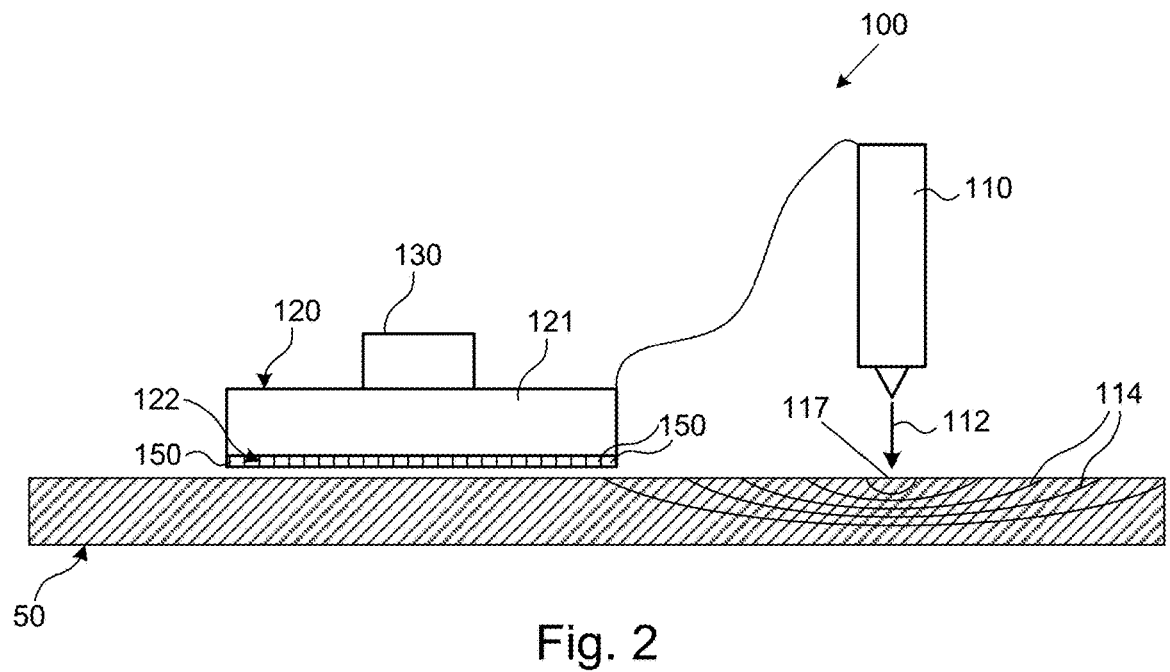
FIG. 2 is a schematic side elevation view of the system of FIG. 1, according to one or more examples of the present disclosure.
Figure 3:
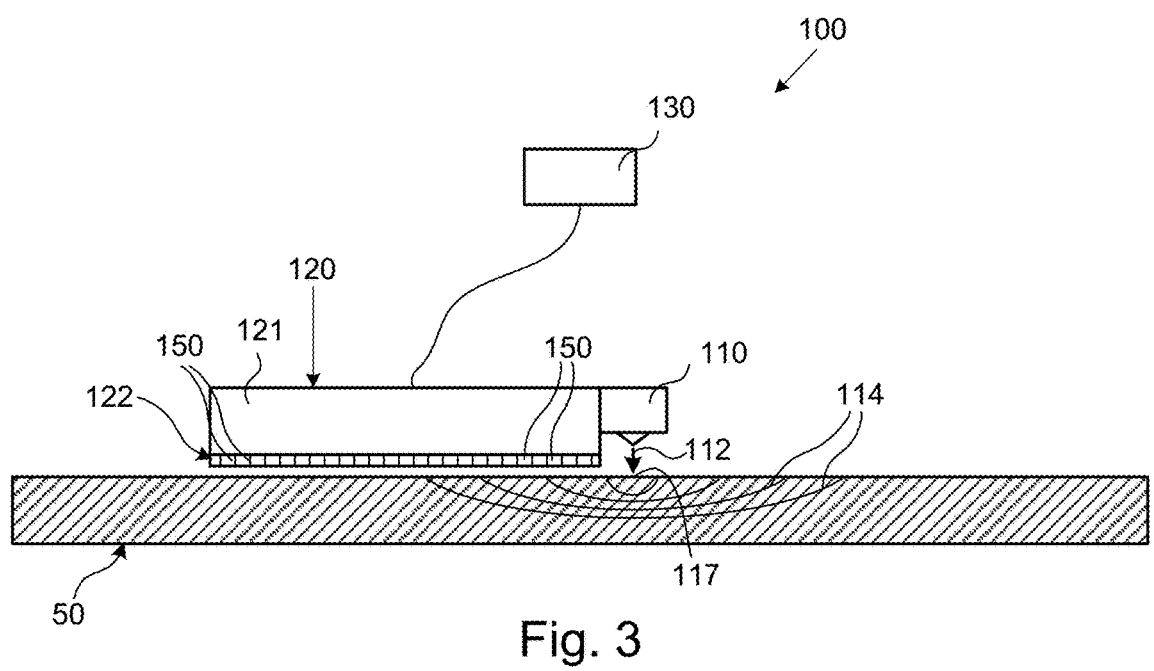
FIG. 3 is a schematic side elevation view of another system for inspecting structural integrity of a part, according to one or more examples of the present disclosure.

FIGS. 2 and 3 show two alternative embodiments of the system 100. According to the embodiment shown in FIG. 2, the vibration initiator 110 of the system 100 is decoupled from the acoustic detector 120 so as to be movable relative to the acoustic detector 120. Moreover, the reporting unit 130 of the system of FIG. 2 is co-movably coupled to the acoustic detector 120. In the depicted embodiment of FIG. 2, the vibration initiator 110 is spaced apart from the acoustic detector 120. In such a configuration, the intensity of the acoustic shockwave 114 may dissipate by the time it reaches the acoustic detector 120, which, in certain situations, may be beneficial to reduce the intensity of the acoustic shockwave to levels that are detectible by the nanotubes 166. In another embodiment, the acoustic detector 120 is temporarily fixed in place and the vibration initiator 110 is moved to different positions. Such a configuration may be used to calibrate the system.

According to the embodiment shown in FIG. 3, the vibration initiator 110 is co-movably coupled to the acoustic detector 120 and thus moves with the acoustic detector 120 during the inspection procedure. In such a configuration, the acoustic detector 120 may still be able to move across the part 50 to get a scan of the entire surface. Moreover, the reporting unit 130 of the system 100 is decoupled from the acoustic detector 120 so as to be movable relative to the acoustic detector 120.

Figure 13:
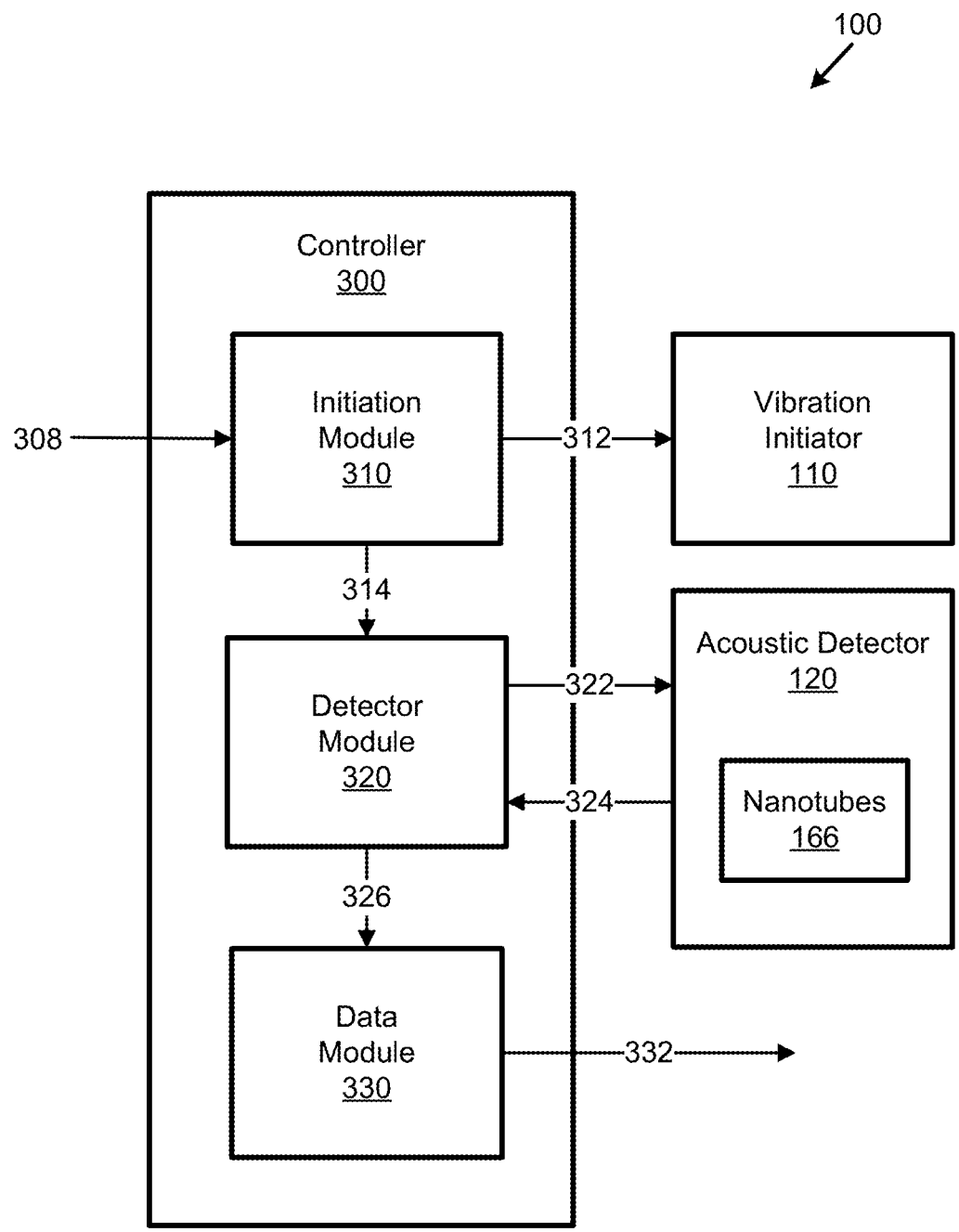
FIG. 13 is a schematic block diagram of a system for inspecting structural integrity of a part, according to one or more examples of the present disclosure.

Referring to FIG. 13, the controller 300 includes an initiation module 310, a detector module 320, and a data module 330, according to one embodiment. The various modules of the controller 300 may be stored and operated from separate components of the system (e.g., the initiation module 310 may be housed in the vibration initiator 110, the detector module 320 may be housed in the acoustic detector 120, and the data module 330 may be housed in the reporting unit 130) or the modules may be stored and operated from a central processing unit of the system 100 local to or remote from the part 50. The initiation module 310 controls the commencement of an inspection procedure. The activation/actuation of the initiation module 310 may be triggered by a commencement command 308 from a user or another source (e.g., automatically set based upon a timing variable). The initiation module 310 sends an acoustic shockwave command 312 to the vibration initiator 110. The acoustic shockwave command 312 may include the intensity, the frequency of vibration, the duration of the ping/pulse, and the position of the ping/pulse, among other variables. The initiation module 110 also, in certain embodiments, may send a timing correlation command 314 to the detector module 320. The timing correlation command 314, as briefly described above, may include synchronization instructions for the detector module 320 to incorporate into its sensing commands 322.

The detector module 320 controls the sensor array 122 of the acoustic detector 120 by sending sensing commands 322 to the acoustic detector 120. The sensing commands 322 may include the timing of when to activate the nanotubes 166 of the sensor array 122, the activation duration of the nanotubes 166, and the location/position of the acoustic detector 120, among others. The timing correlation command 314 received by the detector module 320 may be incorporated into the sensing commands 322 in order to synchronize the initiation of the shockwave with the detection of the shockwave vibrations. In one embodiment, depending on the intensity and frequency of the acoustic shockwave and the distance between the vibration initiator 110 and the acoustic detector 120, the timing correlation command 314 may include a time delay, wherein the nanotubes 166 are to only be activated at a certain time when the acoustic shockwave has propagated to the proper position. In another embodiment, instead of activating the nanotubes 166 at a certain time, the nanotubes 166 may be actively recording/inspecting but the timing correlation command 314 may include instructions pertaining to which data points are to be ignored and which data points are to be recorded, stored, and/or transmitted to the data module 330.

After the detector module 320 sends out the sensing commands 322, the data collected by the acoustic detector 120 is sent back to the detector module 320 as sensed acoustic vibration data 324. The acoustic vibration data 324 may include intensity of the vibration, orientation of the vibration, frequency of the vibration, and duration of the vibration, among other variables. Once the detector module 320 receives the acoustic vibration data 324, the detector module 320 sends the acoustic vibration data 624 to the data module 330. The data module 330 generates a structural integrity report 332 based on the acoustic vibration data 324. In one embodiment, as depicted in FIG. 12, the structural integrity report 332 may include an 'image' of the acoustic vibration data 324.

Figure 14:
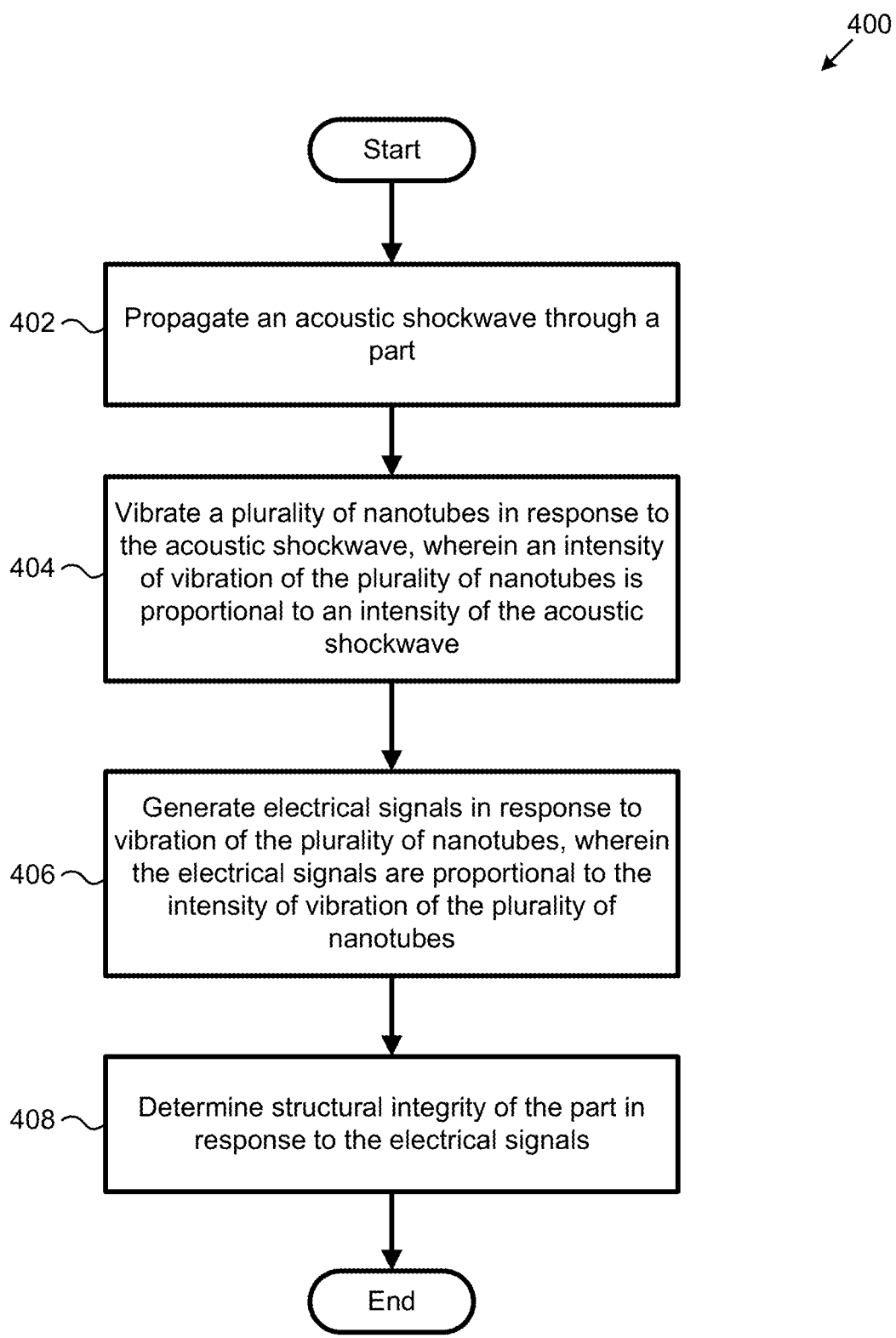
FIG. 14 is a schematic flow diagram of a method of inspecting structural integrity of a part, according to one or more examples of the present disclosure.

According to FIG. 14, one embodiment of a method 400 of inspecting structural integrity of a part includes propagating an acoustic shockwave through the part at 402. The method 400 also includes vibrating a plurality of nanotubes in response to the acoustic shockwave, wherein an intensity of vibration of the plurality of nanotubes is proportional to an intensity of the acoustic shockwave at 404. The nanotubes can be flexed against the part prior to and during vibration of the nanotubes. Additionally, the method 400 includes generating electrical signals in response to vibration of the plurality of nanotubes, wherein the electrical signals are proportional to the intensity of vibration of the plurality of nanotubes at 406. The method 400 also includes determining structural integrity of the part in response to the electrical signals at 408.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the embodiments may be combined in any suitable manner. In the above description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described above with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus for inspecting structural integrity of a part, comprising:
   a body, movable relative to the part; and
   at least one sensor, coupled to and co-movable with the body and comprising a plurality of nanotubes configured to generate electrical signals when acted upon by an acoustic shockwave propagating through the part, the electrical signals being proportional to an intensity of the acoustic shockwave;
   wherein:
   the plurality of nanotubes is configured to generate electrical signals when acted upon by the acoustic shockwave as the body moves relative to the part, and
   the generated electrical signals enable detection of pre-existing structural abnormalities in the part that existed prior to a causation of the acoustic shockwave propagating through the part;
   wherein:
   the at least one sensor further comprises a flexible substrate and an array of microphones on the flexible substrate;
   at least one microphone in the array of microphones comprises the plurality of nanotubes; and
   the plurality of nanotubes extend perpendicular to the flexible substrate.

2. The apparatus according to claim 1, wherein:
   the at least one sensor further comprises a flexible substrate; and
   the plurality of nanotubes are formed on and extend from the flexible substrate.

3. The apparatus according to claim 2, wherein the flexible substrate is made from graphene.

4. The apparatus according to claim 1, further comprising a sensor array wherein:
   the sensor array comprises a plurality of sensors; and
   each sensor of the plurality of sensors generates a composite electrical signal comprising an average of the electrical signals generated by the plurality of nanotubes of that sensor.

5. The apparatus according to claim 4, wherein:
   each sensor comprises a plurality of microphone arrays electrically isolated from each other;
   each microphone array comprises a plurality of microphones electrically coupled to each other; and
   each microphone of the plurality of microphones comprises a portion of the plurality of nanotubes of the sensor.

6. The apparatus according to claim 5, wherein each microphone of the plurality of microphones comprises at least 1,000 nanotubes.

7. The apparatus according to claim 6, wherein each sensor of the sensor array comprises at least 100 microphone arrays.

8. The apparatus according to claim 7, wherein the sensor array comprises at least 100 sensors.

9. The apparatus according to claim 1, wherein the plurality of nanotubes are further configured to generate electrical signals when acted upon by phonons of sound produced by oscillation of atoms in the part, wherein the atoms in the part are oscillated by the acoustic shockwave.

10. A system for inspecting structural integrity of a part, comprising:
a vibration initiator configured to impart an acoustic shockwave to a part;
an acoustic detector configured to detect the acoustic shockwave as the acoustic shockwave propagates through the part,
wherein:
the acoustic detector comprises a body and a plurality of nanotubes co-movably coupled to the body and configured to generate electrical signals when acted upon by the acoustic shockwave, and
the body and the plurality of nanotubes of the acoustic detector are movable across a surface of the part as the plurality of nanotubes generates the electrical signal;
the generated electrical signals enable detection of pre-existing structural abnormalities in the part that existed prior to a causation of the acoustic shockwave propagating through the part; and
a reporting unit configured to determine structural integrity of the part in response to the electrical signals detect, utilizing the generated electrical signals, pre-existing structural abnormalities in the part that existed prior to a causation of the acoustic shockwave propagating through the part;
wherein:
the at least one detector further comprises a flexible substrate and an array of microphones on the flexible substrate;
at least one microphone in the array of microphones comprises the plurality of nanotubes; and
the plurality of nanotubes extend perpendicular to the flexible substrate.

11. The system of claim 10, wherein:
the acoustic detector further comprises a plurality of sensors;
each sensor comprises a plurality of nanotubes;
each sensor generates a composite electrical signal comprising an average of the electrical signals generated by the plurality of nanotubes of that sensor; and
the reporting unit is further configured to determine structural integrity of the part in response to the composite electrical signals generated by the plurality of sensors.

12. The system of claim 11, wherein:
the reporting unit generates a 2-dimensional image representative of structural integrity of the part;
the 2-dimensional image comprises a plurality of 2-dimensional pixels each corresponding with a respective sensor of the plurality of sensors and each comprising a single visual representation of a condition of the part; and
the single visual representation of each of the plurality of 2-dimensional pixels is based on the composite electrical signal generated by the sensor corresponding with the respective 2-dimensional pixel.

13. The system of claim 10, wherein the acoustic detector detects the acoustic shockwave in synchronization with the vibration initiator imparting the acoustic shockwave to the part.

14. The system of claim 10, further comprising a controller comprising:
an initiation module configured to command the vibration initiator to impart the acoustic shockwave to the part;
a detector module configured to:
command the acoustic detector to detect the acoustic shockwave in response to the initiation module commanding the vibration initiator to impart the acoustic shockwave; and
receive the electrical signals generated by the plurality of nanotubes of the acoustic detector; and
a data module configured to:
receive electrical signal data from the detector module, the electrical signal data being representative of the electrical signals received by the detector module; and
communicate the electrical signal data to the reporting unit, wherein the reporting unit determines structural integrity of the part in response to the electrical signal data.

15. A method of inspecting structural integrity of a part, comprising:
propagating an acoustic shockwave through the part;
moving a body, to which a plurality of nanotubes is co-movably coupled, across a surface of the part, wherein the body comprises at least one sensor comprising a flexible substrate and an array of microphones on the flexible substrate;
at least one microphone in the array of microphones comprises the plurality of nanotubes; and
the plurality of nanotubes extend perpendicular to the flexible substrate;
while the body and the plurality of nanotubes are moved across the surface of the part:
vibrating the plurality of nanotubes in response to the acoustic shockwave, wherein an intensity of vibration of the plurality of nanotubes is proportional to an intensity of the acoustic shockwave; and
generating electrical signals in response to vibration of the plurality of nanotubes, wherein the electrical signals are proportional to the intensity of vibration of the plurality of nanotubes; and
utilizing the generated electrical signals to detect pre-existing structural abnormalities in the part that existed prior to a causation of the acoustic shockwave propagating through the part.

16. The method according to claim 15, wherein determining structural integrity of the part comprises determining residual stress in the part.

17. The method according to claim 15, wherein determining structural integrity of the part comprises determining cracks in the part.

18. The method according to claim 15, further comprising averaging the electrical signals to create a composite electrical signal, wherein structural integrity of the part is determined in response to the composite electrical signal.

19. The method according to claim 15, further comprising flexing the plurality of nanotubes against the part, wherein the plurality of nanotubes are vibrated in response to the acoustic shockwave while the plurality of nanotubes are flexed against the part.

* * * * *